(12) United States Patent
Bradley et al.

(10) Patent No.: US 11,372,911 B2
(45) Date of Patent: *Jun. 28, 2022

(54) COMMENTARY MANAGEMENT IN A SOCIAL NETWORKING ENVIRONMENT WHICH INCLUDES A SET OF MEDIA CLIPS

(71) Applicant: INTERNATIONAL BUSINESS MACHINES CORPORATION, Armonk, NY (US)

(72) Inventors: Lisa M. Bradley, Cary, NC (US); Jonathan Dunne, Dungarvan (IE); Liam Harpur, Dublin (IE); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/834,455

(22) Filed: Mar. 30, 2020

(65) Prior Publication Data

US 2020/0226170 A1 Jul. 16, 2020

Related U.S. Application Data

(63) Continuation of application No. 15/098,441, filed on Apr. 14, 2016, now Pat. No. 10,642,884.

(51) Int. Cl.
*G06F 16/48* (2019.01)
*G06F 16/28* (2019.01)

(52) U.S. Cl.
CPC ............ *G06F 16/48* (2019.01); *G06F 16/285* (2019.01)

(58) Field of Classification Search
CPC .............................. G06F 16/48; G06F 16/285

USPC ......................................................... 707/740
See application file for complete search history.

(56) References Cited

U.S. PATENT DOCUMENTS

| | | | |
|---|---|---|---|
| 7,962,555 B2 | 6/2011 | Sastry | |
| 8,010,613 B2 | 8/2011 | Oral | |
| 8,201,095 B2 | 6/2012 | Dewar | |
| 2011/0264737 A1 | 10/2011 | Skinner | |
| 2013/0110565 A1 | 5/2013 | Means, Jr. | |
| 2013/0185106 A1* | 7/2013 | Donatone | G06Q 10/06 705/7.14 |
| 2014/0006930 A1 | 1/2014 | Hollis | |
| 2015/0003595 A1 | 1/2015 | Yaghi | |
| 2015/0222587 A1 | 8/2015 | Bastide | |
| 2015/0331856 A1 | 11/2015 | Choi | |

(Continued)

OTHER PUBLICATIONS

Guo et al., "Event-Based User Classification in Weibo Media," The Scientific World Journal, 2014, p. 1-11, vol. 2014, Article ID 479872, Hindawi Publishing Corporation.

(Continued)

*Primary Examiner* — Kimberly L Wilson
(74) *Attorney, Agent, or Firm* — Rakesh Roy

(57) ABSTRACT

Disclosed aspects relate to commentary management in a social networking environment. The social networking environment may include a set of media clips. The set of media clips may be analyzed in the social networking environment with respect to a set of commentary typology data. Based on the analyzing, a set of benchmark typology data which indicates a set of commentary norms of the set of media clips may be determined. A set of benchmark typology data may be established for utilization by the social networking environment.

18 Claims, 5 Drawing Sheets

(56) References Cited

U.S. PATENT DOCUMENTS

| | | |
|---|---|---|
| 2015/0347463 A1 | 12/2015 | Voss |
| 2016/0021179 A1 | 1/2016 | James |
| 2016/0065519 A1* | 3/2016 | Waltermann ............ H04L 67/10 709/206 |
| 2016/0080303 A1* | 3/2016 | Deolalikar ............ G06Q 10/107 709/206 |
| 2016/0110433 A1 | 4/2016 | Harpreet |
| 2016/0191958 A1 | 6/2016 | Nauseef |
| 2017/0017986 A1 | 1/2017 | Mathis |
| 2017/0159713 A1* | 6/2017 | Ito ........................... F16N 13/22 |
| 2017/0220580 A1* | 8/2017 | Chi .................. G06F 16/90328 |
| 2017/0300492 A1 | 10/2017 | Bradley |

OTHER PUBLICATIONS

IBM: List of IBM Patents or Patent Applications Treated as Related (Appendix P), Apr. 13, 2020, pp. 1-2.

\* cited by examiner

COMMENTARY MANAGEMENT IN A SOCIAL NETWORKING ENVIRONMENT WHICH INCLUDES A SET OF MEDIA CLIPS

BACKGROUND

This disclosure relates generally to computer systems and, more particularly, relates to commentary management in a social networking environment. Commentary management may be desired to be performed as efficiently as possible. The amount of commentary data that needs to be managed by enterprises is increasing. As data needing to be managed increases, the need for commentary management efficiency may increase.

SUMMARY

Aspects of the disclosure relate to managing media content in a social networking environment based on a set of commentary criteria. Communications in a social networking environment may be analyzed to identify topics or themes included in the media content. A topic or theme that exceeds a threshold may be used to identify an established conversation thread. Based on determining a theme or change to the established conversation thread, an action may be performed with respect to the media content. Accordingly, information related to the topic or theme of a conversation thread can be leveraged to organize or arrange the media content to facilitate communication between users in a social networking environment.

Disclosed aspects relate to commentary management in a social networking environment. The social networking environment may include a set of media clips. The set of media clips may be analyzed in the social networking environment with respect to a set of commentary typology data. Based on the analyzing, a set of benchmark typology data which indicates a set of commentary norms of the set of media clips may be determined. A set of benchmark typology data may be established for utilization by the social networking environment.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
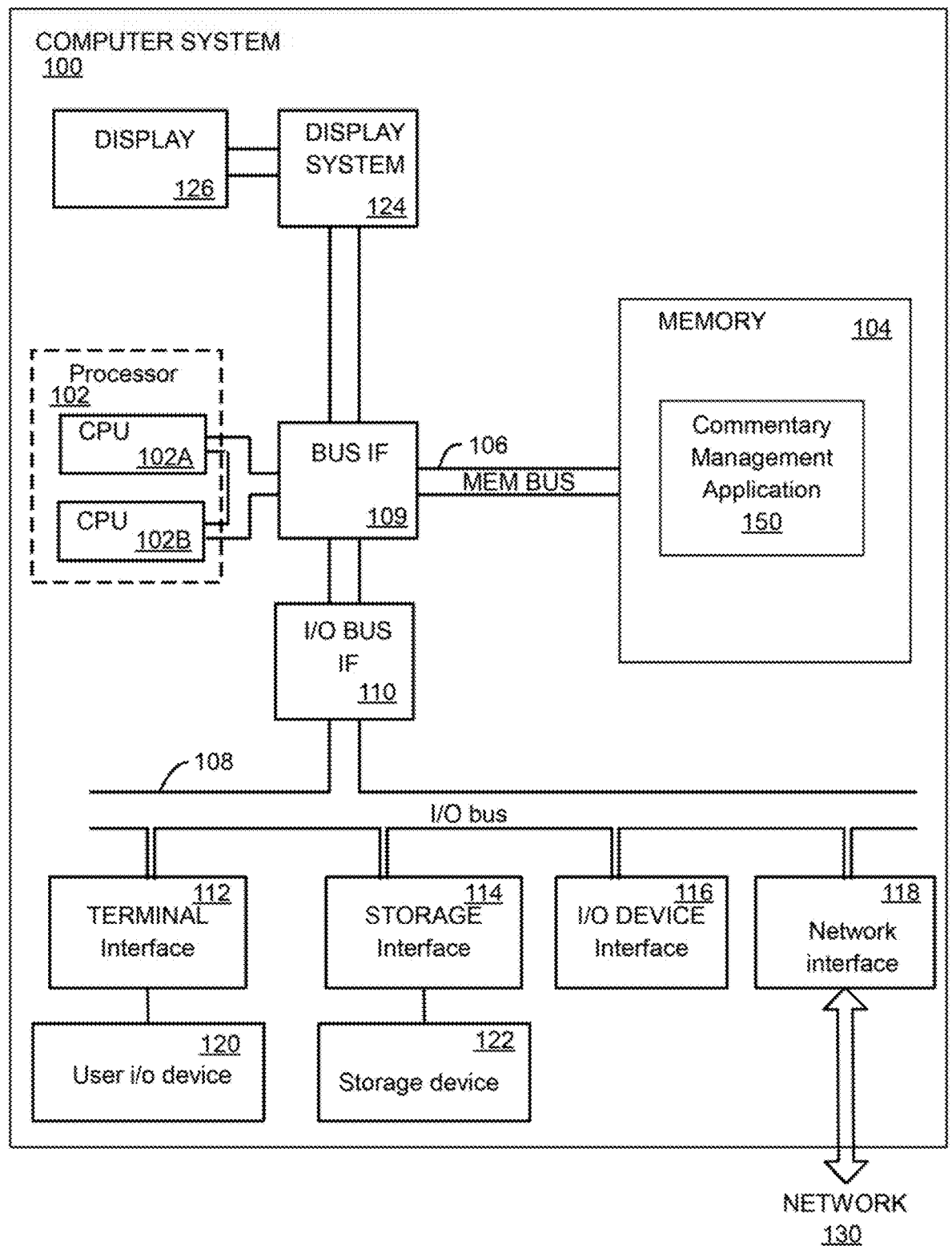
FIG. 1 depicts a high-level block diagram of a computer system for implementing various embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing media content in a social networking environment based on a set of commentary criteria. Communications in a social networking environment may be analyzed (e.g., using the commentary criteria) to identify topics or themes included in the media content. A topic or theme that exceeds a threshold may be used to identify an established conversation thread. Based on determining a theme or change to the established conversation thread, an action may be performed with respect to the media content. Accordingly, information related to the topic or theme of a conversation thread can be leveraged to organize or arrange the media content to facilitate communication between users in a social networking environment. Aspects of the disclosure may be associated with performance or efficiency benefits for asynchronous video interaction (e.g., speed, flexibility, productivity, communication efficiency, focused conversations, clarity, information accuracy, user satisfaction). Aspects may save resources such as bandwidth, processing, or memory.

As the amount of information transmitted over computer networks, such as the Internet, rapidly increases, users are increasingly making use of communication tools that incorporate audio and video media. For instance, within social networking environments, users may engage in communication using images, voice recordings, or video comments to exchange thoughts, ideas, and opinions. In some situations, viewing the audio and video content submitted by other users prior to submission of a new comment requires significant time on the part of a user. Accordingly, aspects of the disclosure relate to managing media content in a social networking environment to provide a user with information regarding various aspects (e.g., tone, mood, topic) of a conversation thread to facilitate communication with the social networking environment.

Aspects of the disclosure include a method, system and computer program product for commentary management in a social networking environment. The social networking environment may include a set of media clips that have audio. The set of media clips in the social networking environment may be analyzed with respect to a set of commentary typology criteria. Based on analyzing the set of media clips, a set of benchmark typology data which indicates a set of commentary norms of the set of media clips that have audio may be determined. In embodiments, determining the set of benchmark typology data may include using a clustering technique to calculate the set of commentary norms. Based on the set of commentary norms, the set of benchmark typology data may be formulated. The set of benchmark typology data may be established for utilization by the social networking environment.

The set of commentary typology data may include a selection from a group consisting of at least one of a smile criterion, an eye focus criterion, a facial expression criterion, a body language criterion, a gesture rate criterion, a disposition criterion, a style criterion, a mood criterion, a vocal tone criterion, a speech pace criterion, a topic criterion, a theme criterion, a word tone criterion, a language brevity criterion, or a key word criterion. The set of benchmark typology data may include a selection from a group consisting of at least one of a smile benchmark value, an eye focus benchmark value, a facial expression benchmark value, a body language benchmark value, a gesture rate benchmark value, a disposition benchmark value, a style benchmark value, a mood benchmark value, a vocal tone benchmark value, a speech pace benchmark value, a topic benchmark value, a theme benchmark value, a word tone benchmark value, a language brevity benchmark value, or a key word benchmark value.

Aspects of the disclosure relate to using the set of benchmark typology data to identify a target set of typology elements for a new media clip. The target set of typology elements may include a smile factor, an eye focus factor, a facial expression factor, a body language factor, a gesture rate factor, a disposition factor, a style factor, a mood factor, a vocal tone factor, a speech pace factor, a topic factor, a theme factor, a word tone factor, a language brevity factor, or a key word factor. The target set of typology elements for the new media clip may be provided to a user by the social networking environment. Providing the target set of typology elements for the new media clip may include presenting a set of suggested target information in advance of generating the new media clip for utilization to align the new media clip with the set of media clips.

Aspects of the disclosure relate to receiving a new media clip. Based on the new media clip, a computed set of typology elements may be computed for the new media clip. The computed set of typology elements may include smile factor, an eye focus factor, a facial expression factor, a body language factor, a gesture rate factor, a disposition factor, a style factor, a mood factor, a vocal tone factor, a speech pace factor, a topic factor, a theme factor, a word tone factor, a language brevity factor, or a key word factor. The computed set of typology elements for the new media clip may be provided to a user by the social networking environment. Providing the computed set of typology elements for the new media clip may include presenting a set of computed information in response to receiving the new media clip for utilization to compare alignment of the new media clip with the set of media clips. In embodiments, aspects of the disclosure relate to comparing the computed set of typology elements for the new media clip with the set of benchmark typology data to ascertain an alignment score for the new media clip with respect to the set of media clips. The alignment score may be provided to the user.

Aspects of the disclosure relate to monitoring, by the social networking environment, for a threshold change in the set of benchmark typology data. Based on the set of benchmark typology data, the threshold change in the set of benchmark typology data may be detected by the social networking environment. Based on the threshold change in the set of benchmark typology data, a new arrangement of the set of media clips that have audio may be determined. The new arrangement may include both a first subset of the set of media clips and a second subset of the set of media clips. The new arrangement may be constructed such that the first subset of the set of media clips are separate from the second subset of the set of media clips.

Aspects of the disclosure relate to identifying, by the social networking environment, the set of benchmark typology data for a set of users which correlate with the set of media clips. Based on the set of benchmark typology data for the set of users, a sentiment trend of the set of users may be determined by the social networking environment. The sentiment trend may correlate with the set of media clips. The sentiment trend may be provided by the social networking environment to a user.

Turning now to the figures, FIG. 1 depicts a high-level block diagram of a computer system for implementing various embodiments of the present disclosure, consistent with various embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a commentary management application 150. In embodiments, the commentary management application 150 may include instructions or statements that execute on the processor 102 or instructions or statements that are interpreted by instructions or statements that execute on the processor 102 to carry out the functions as further described below. In certain embodiments, the commentary management application 150 is implemented in hardware via semiconductor devices, chips, logical gates, circuits, circuit cards, and/or other physical hardware devices in lieu of, or in addition to, a processor-based system. In embodiments, the commentary management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

FIG. 1 depicts several major components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
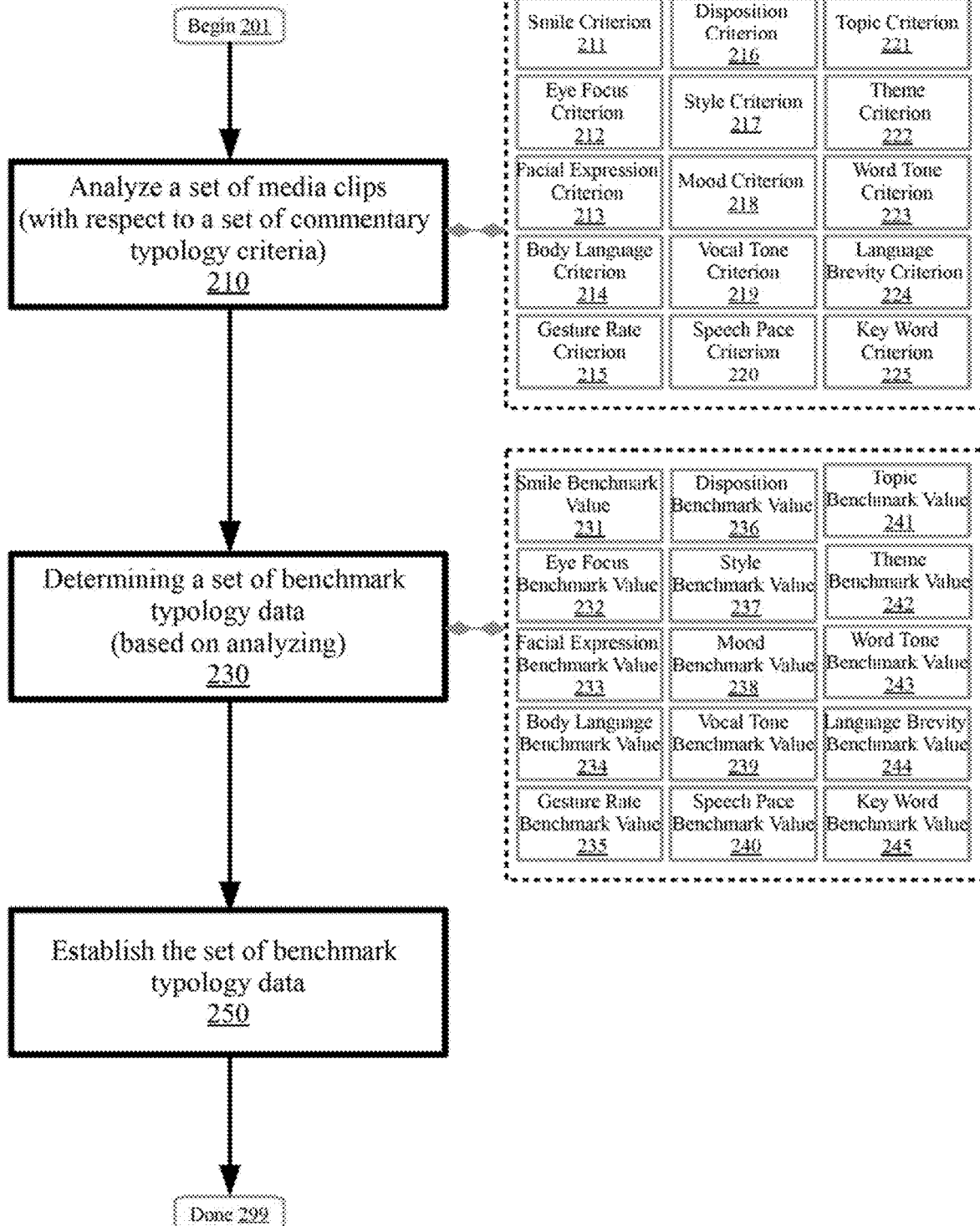
FIG. 2 is a flowchart illustrating a method for managing commentary in a social networking environment, according to embodiments.

FIG. 2 is a flowchart illustrating a method 200 for managing commentary in a social networking environment. Aspects of method 200 relate to analyzing a set of media clips with respect to a set of commentary typology criteria to determine a set of benchmark typology data that indicates a set of commentary norms for the set of media clips. The set of benchmark typology data may be established for utilization by the social networking environment. The benchmark typology data may facilitate communication between users in the social networking environment. The method 200 may begin at block 201.

At block 210, the set of media clips may be analyzed with respect to a set of commentary typology criteria. The set of media clips may be analyzed in the social networking environment. Generally, analyzing can include examining (e.g., performing an inspection of the set of media clips), evaluating (e.g., generating an appraisal of the set of media clips), resolving (e.g., ascertaining an observation/conclusion/answer with respect to the set of media clips), parsing (e.g., deciphering structured and unstructured data constructs of the set of media clips), querying (e.g., asking a question regarding the set of media clips), or categorizing (e.g., organizing by a feature or type of the set of media clips). In embodiments, analyzing the set of media clips can include using one or more content analysis techniques to ascertain one or more characteristics, features, properties, or attributes of the set of media clips. As an example, in certain embodiments, analyzing the set of media clips (e.g., a video) may include using a video content analysis technique to determine a topic of the video. Other methods of analyzing the set of media clips are also possible.

In embodiments, the set of media clips can include one or more discrete packages of textual, audio, or video content. As described herein, aspects of the disclosure relate to a set of media clips that have audio. For instance, the set of media clips may include videos, audio files, narrated text documents, or other types of data. In embodiments, the set of media clips may include one or more video comments posted or submitted in a social networking environment. As an example, a social discussion forum may include multiple conversation threads, each with a plurality of media clips in the form of video comments, audio comments, and text comments submitted by users of a social networking environment. In embodiments, the set of media clips may relate to a particular topic, correspond to a particular audio or visual style, or have a certain emotional tone or theme. Other types of the set of media clips are also possible.

In embodiments, aspects of the disclosure relate to managing commentary in a social networking environment. Generally, the social networking environment can include a platform that offers communication tools to facilitate the sharing of information, ideas, pictures, video, messages, and other data between a community of users. As examples, the social networking environment may include one or more of an instant messaging platform (e.g., chat service), a short messaging service (e.g., mobile text messaging), a wiki database (e.g., user maintained digital encyclopedia), social community (e.g., group of users), newsfeed (e.g., interface for reception and display news events and activity data), email platform (e.g., internet or other network-based messaging tool), project collaboration (e.g., group of users working together on a task), or the like. In embodiments, the social networking environment may include a number of linked web pages that support chat, messaging, and other information sharing services between users. In embodiments, the social networking environment may host profile pages for users that include information regarding individuals' areas of expertise, activities, background, work experience, schedule, past projects, and the like. Other types of social networking environment and social networking features are also possible.

In embodiments, analyzing the set of media clips can include using a set of commentary typology criteria. Generally, the set of commentary typology criteria can include one or more standards or metrics that may be used to gauge, measure, or otherwise evaluate an aspect or feature of the set of media clips. As described herein, aspects of the disclosure relate to analyzing the set of media clips with respect to the set of commentary typology criteria. In embodiments, the set of media clips may be analyzed using content analysis techniques to ascertain one or more characteristics, features, properties, or attributes of the set of media clips. As examples, the content analysis techniques may include time scaling, key analysis, audio effects, dynamic masking, ego-motion estimation, motion detection, shape recognition, object detection, style detection, video tracking, or other algorithms or functions to examine the set of media clips. In response to analyzing the set of media clips, one or more aspects of the set of media clips may be extracted and evaluated based on the set of typology data. In embodiments, the aspects extracted from the set of media clips may be ascertained in response to determining a correlation between a feature of the set of media clips and a predetermined commentary typology criterion. Other methods of analyzing the set of media clips with respect to the set of commentary typology data are also possible.

As described herein, the set of commentary typology criteria can include one or more standards or metrics that may be used to gauge, measure, or otherwise evaluate an aspect or feature of the set of media clips. In embodiments, the set of commentary typology criteria may include a smile criterion at block 211. The smile criteria may relate to the quality, magnitude, character, or nature of a smile exhibited by one or more subjects depicted in a video comment. As examples, the smile criteria may include mouth shape, smile size, teeth visibility, degree of mouth inclination, or other attributes of a smile. In embodiments, the set of commentary typology criteria may include an eye focus criterion at block 212. The eye focus criterion may relate to the frequency, duration, direction, or object of the gaze of one or more individuals of the video comment. For instance, the eye focus criterion may include identifying an object that one or more individuals is looking at, how frequently their gaze returns to the object, gaze intensity, or the like. In embodiments, the set of commentary typology criteria may include a facial expression criterion at block 213. The facial expression criterion may relate to a feeling, emotion, character, attitude, or mood indicated by the facial features of a subject of a video comment. As examples, the facial expression criterion may include an indication of joy, sadness, admiration, fear, anger, anticipation, disgust, surprise, or the like. Other types of commentary typology criteria are also possible.

In embodiments, the set of commentary typology criteria can include a body language criterion at block 214. The body language criterion may relate to the type, manner, and frequency of physical behaviors used by one or more subjects of a video comment to express thoughts, intentions, or feelings. For instance, the body language criterion may include body posture, eye movement, touch, and the use of surrounding space. In embodiments, the set of commentary typology criteria may include a gesture rate criterion at block 215. The gesture rate criterion may relate to the frequency, speed, and type of gestures (e.g., during speech) used by an individual of a video comment. As examples, the gesture rate criterion may include the speed, rate, frequency, or type of the gesticulations made by a user (e.g., number of times a gesture is made per given time period). In embodiments, the gesture rate criterion may include identifying the meaning of particular culturally or contextually significant gestures. In embodiments, the commentary typology criterion may include a disposition criterion at block 216. The disposition criterion may relate to the nature, attitude, emotional outlook, or apparent state of mind of an individual. For example, the disposition criterion may include agreeable, disagreeable, friendly, solitary, optimistic, pessimistic, introverted, extroverted, accepting, strict, impatient, patient, or the like. Other types of commentary typology criteria are also possible.

In embodiments the set of commentary typology criteria may include a style criterion at block 217. The style criterion may relate to the outward or visible form of expression of one or more aspects of a video comment. In embodiments, the style criterion may relate to the manner in which an individual speaks or otherwise conveys his/her thoughts. For example, the style criterion may include dramatic, subdued, eloquent, poetic, passionate, enthused, oratory, or the like. In embodiments, the style criterion may relate to the outward appearance of one or more aspects of a video comment. For instance, the style criterion may relate to the clothing, setting, objects, accessories, or other aspects of the video. In embodiments, the set of commentary typology criteria may include a mood criterion at block 218. The mood criterion may relate to the emotional state of an individual or the prevailing emotional tone of a video comment. As examples, the mood criterion may include cheerful, tense, excited, lethargic, melancholy, peaceful, relaxed, humorous, or the like. In embodiments, the set of commentary typology criteria may include a vocal tone criterion at block 219. The vocal tone criterion may relate to the quality, pitch, source, character, accent, or magnitude of the voice of an individual of a video or audio clip. For example, the vocal tone criterion may include high or low pitch (e.g., vocal types such as soprano, tenor, baritone), vocal volume (e.g., loud or soft), emotion (e.g., excited, happy, irritated), or the like. Other types of commentary typology criteria are also possible.

In embodiments, the commentary typology criteria may include a speech pace criterion at block 220. The speech pace criterion may relate to the speed, rhythm, or tempo at which an individual of an audio or video clip speaks. For example, the speech pace criterion may include relative estimations (e.g., fast, moderate, slow) or objective measurements (e.g., 150 words per minute) of speech rate. In embodiments, the commentary typology criteria may include a topic criterion at block 221. The topic criterion may relate to a subject matter, theme, question, or other issue. As examples, the topic criterion may include topics such as software development, budget management, customer support, history, renewable energy, stock market trends, oil prices, board games, sports, corn farming, or the like. In embodiments, the commentary typology criteria may include a theme criterion at block 222. The theme criterion may relate to an idea, motif, or other common element shared between one or more aspects of a media clip. In embodiments, the theme criterion may include a message or idea explicitly or implicitly conveyed by the media clip. As examples, the theme criterion may include loyalty, faith, good versus evil, personal growth, heroism, ambition, courage, or the like. Other types of commentary typology criteria are also possible.

In embodiments, the commentary typology criteria may include a word tone criterion at block 223. The word tone criterion may relate to the nuance, distinction, inflection, or intonation of one or more words of the set of media clips. As examples, emphasis placed on the word "you" may indicate accusation, or elongated words or stressed adjectives may indicate sarcasm. In embodiments, the commentary typology criteria may include a language brevity criterion at block 224. The language brevity criterion may relate to how shortly or concisely (e.g., with respect to time or number of words) an idea, comment, phrase, or concept is communicated. For example, the language brevity criterion may include a measurement of the time duration occupied by an individual to convey a thought, or a count of the number of words used to describe a concept. In embodiments, the commentary typology criteria may include a key word criterion at block 225. The keyword criterion may relate to the use of a word or phrase of particular meaning or significance. In embodiments, the keyword criterion may include one or more words that carry a special meaning with respect to a certain topic or context. As examples, the phrase "market share expansion" may be a keyword with respect to the topic of business development, or the term "traffic regulation" may be a keyword that depends on context (e.g., the keyword may relate to topics of road construction or computer network data management). Other types of commentary typology criteria are also possible.

Consider the following example. A set of media clips that include multiple video comments in a social networking environment may be analyzed with respect to the set of commentary typology criteria using a combination of motion detection, object detection, and audio key analysis techniques. As described herein, one or more aspects of a first video comment may be evaluated based on the set of commentary typology criteria. For instance, in response to evaluating the first video comment, it may be determined that the video relates to a topic of "stock market speculation" (e.g., based on the topic criterion), is delivered in a style of "lecturing" (e.g., based on the style criterion), that the speaker in the video has a rapid speech pace of 170 words per minute (e.g., based on the speech pace criterion) and a disposition of "confident" (e.g., based on the disposition criterion), and that the video includes key words of "bull market" and "aggressive investment" (e.g., based on the keyword criterion). Other methods of using the commentary typology criteria to evaluate the set of media clips are also possible.

At block 230, a set of benchmark typology data may be determined. Determining the set of benchmark typology data may be based on analyzing the set of media clips. Generally, determining can include identifying, computing, detecting, or ascertaining the set of benchmark typology data. As described herein, determining may include ascertaining a set of benchmark typology data which indicates a set of commentary norms of the set of media clips. In embodiments, determining can include aggregating result data from one or more analyses of the set of media clips to ascertain an average or standard for one or more attributes, features, or characteristics of the set of media clips. Consider the following example. The analysis results for three video comments that are part of the same conversation thread may be gathered. The analysis result for the first video may indicate a speech pace of 133 words per minute, the analysis result for the second video may indicate a speech pace of 146 words per minute, and the analysis result for the third video may indicate a speech pace of 161 words per minute. Accordingly, determining may include aggregating the results for the three videos and ascertaining a benchmark for the attribute of "speech pace" of 147 words per minute (e.g., the numerical average of the three individual speech pace results). Other methods of determining the set of benchmark typology data are also possible.

In embodiments, the set of benchmark typology data may indicate a set of commentary norms of the set of media clips. Generally, the commentary norms indicated by the set of benchmark typology data can include qualitative or quantitative representations of the average, standard, or typical state of one or more attributes or features of the set of media clips. For example, in response to analyzing a series of short video comments in which one or more individuals cheer "Happy New Year," benchmark typology data for an attribute of "mood" may be determined to be "celebratory." In embodiments, the set of benchmark typology data may include a quantitative measure, grade, rank, representation, index, or other expression of the average or typical state of an attribute of the set of media clips. For instance, the benchmark typology criteria may be expressed as an integer (e.g., benchmark value) between 0 and 100, where greater values are associated with greater magnitudes or intensities of the attribute, and lesser values are associated with lower levels of magnitude. For example, an attribute of "seriousness" may be associated with a benchmark value of 17 in the case of a less serious video comment (e.g., casual description of a historical event), and a benchmark value of 62 in the case of a more serious video comment (e.g., warning about a potential negative consequence to an action). Other types of the set of benchmark typology data are also possible.

In embodiments, the benchmark typology criteria may include qualitative or quantitative representations of the average, standard, or typical state of features that substantially correspond to the set of commentary typology data. In embodiments, the set of benchmark typology data may include a smile benchmark value (e.g., 40 degree mouth inclination from the horizontal) at block 231 that substantially corresponds to the smile criterion, an eye focus benchmark value (e.g., 14 second gaze duration) at block 232 that substantially corresponds to the eye focus criterion, a facial expression benchmark value (e.g., smile frequency of twice per minute) at block 233 that substantially corresponds to the facial expression criterion, a body language benchmark value (e.g., arms crossed for 20% of total video length) at block 234 that substantially corresponds to the body language criterion, and a gesture rate benchmark value (e.g., 5 hand gestures per minute) at block 235 that substantially corresponds to the gesture rate criterion. Other types of the set of benchmark typology data are also possible.

In embodiments, the set of benchmark typology data may include a disposition benchmark value (e.g., "accepting" factor of 40 based on responses to other individuals) at block 236 that substantially corresponds to the disposition criterion, a style benchmark value (e.g., "formality" factor of 64 based on dress and use of language) at block 237 that substantially corresponds to the style criterion, a mood benchmark value (e.g., "cheerful" factor of 87 based on smile and laughter frequency) at block 238 that substantially corresponds to the mood criterion, a vocal tone benchmark value (e.g., 140 Hertz) at block 239 that substantially corresponds to the vocal tone criterion, and a speech pace benchmark value (e.g., 190 words per minute) at block 240 that substantially corresponds to the speech pace criterion. Other types of the set of benchmark typology data are also possible.

In embodiments, the set of benchmark typology data may include a topic benchmark value (e.g., topic alignment value of 41) at block 241 that substantially corresponds to the topic criterion, a theme benchmark value (e.g., theme relevancy score of 16) at block 242 that substantially corresponds to the theme criterion, a word tone benchmark value (e.g., second syllable emphasis frequency of 40%) at block 243 that substantially corresponds to the word tone criterion, a language brevity benchmark value (e.g., 427 words) at block 244 that substantially corresponds to the language brevity criterion, and a key word benchmark value (e.g., keyword usage frequency of once every 118 words) at block 245 that substantially corresponds to the key word criterion. Other types of the set of benchmark typology data are also possible.

Consider the following example in which a benchmark value is calculated for a benchmark typology criterion of "excitement". The analysis results for three video comments from the same conversation thread may be aggregated. The conversation thread may be associated with a topic of "New Movie Launch: Post Viewing Discussion." The analysis results may indicate that the first video comment is associated with a mood of "elated" and a style of "animated discussion." The analysis results may indicate that the second video comment is associated with a speech pace of "rapid; 176 words per minute" and a vocal tone of "elevated." The analysis results may indicate that the third video comment is associated with a gesture rate of "Over 10 gestures per minute" and a facial expression of "enthusiasm." In embodiments, one or more content analysis techniques or algorithms may be used to compare the attributes of the video comments with a database of archived weighting criteria to generate a relative index of the magnitude of excitement associated with the set of media clips. As an example, based on the database of archived weighting criteria, a benchmark value of "71" may be computed for the benchmark typology criterion of "excitement." Other methods of determining the benchmark value are also possible.

At block 250, the set of benchmark typology data may be established. In embodiments, the set of benchmark typology data may be established for utilization by the social networking environment. Generally, establishing can include generating, creating, producing, forming, collecting, capturing, gathering, aggregating, maintaining, saving, or storing the set of benchmark typology data. In embodiments, establishing the set of benchmark typology data may include recording the set of benchmark typology data in a database, directory, index, or other structured body of information. The database may include one or more data entries for different attributes of the set of media clips (e.g., speech pace, tone, language brevity) together with associated benchmark values, weighting criteria, and other information. In embodiments, the database may include comments, tags, or other textual descriptions or summaries for the set benchmark typology data. As an example, in response to determining a speech pace of 143 words per minute, and a style of "persuasive" for a series of media clips, establishing may include generating a data entry (e.g., style; speech pace) in the database for the set of media clips, and entering the determined benchmark typology data (e.g., persuasive, 143 words per minute) in association with the generated data entry. Other methods of establishing the benchmark typology data are also possible.

Method 200 concludes at block 299. Aspects of method 200 may provide performance or efficiency benefits for commentary management. For example, aspects of method 200 may have positive impacts with respect to information relevancy and topic congruency. As described herein, the analyzing, determining, and establishing described herein may each occur in an automated fashion without user invention. Altogether, establishing a set of benchmark typology data for a set of media clips may be associated with performance or efficiency benefits (e.g., communication efficiency, clarity, information accuracy).

Figure 3:
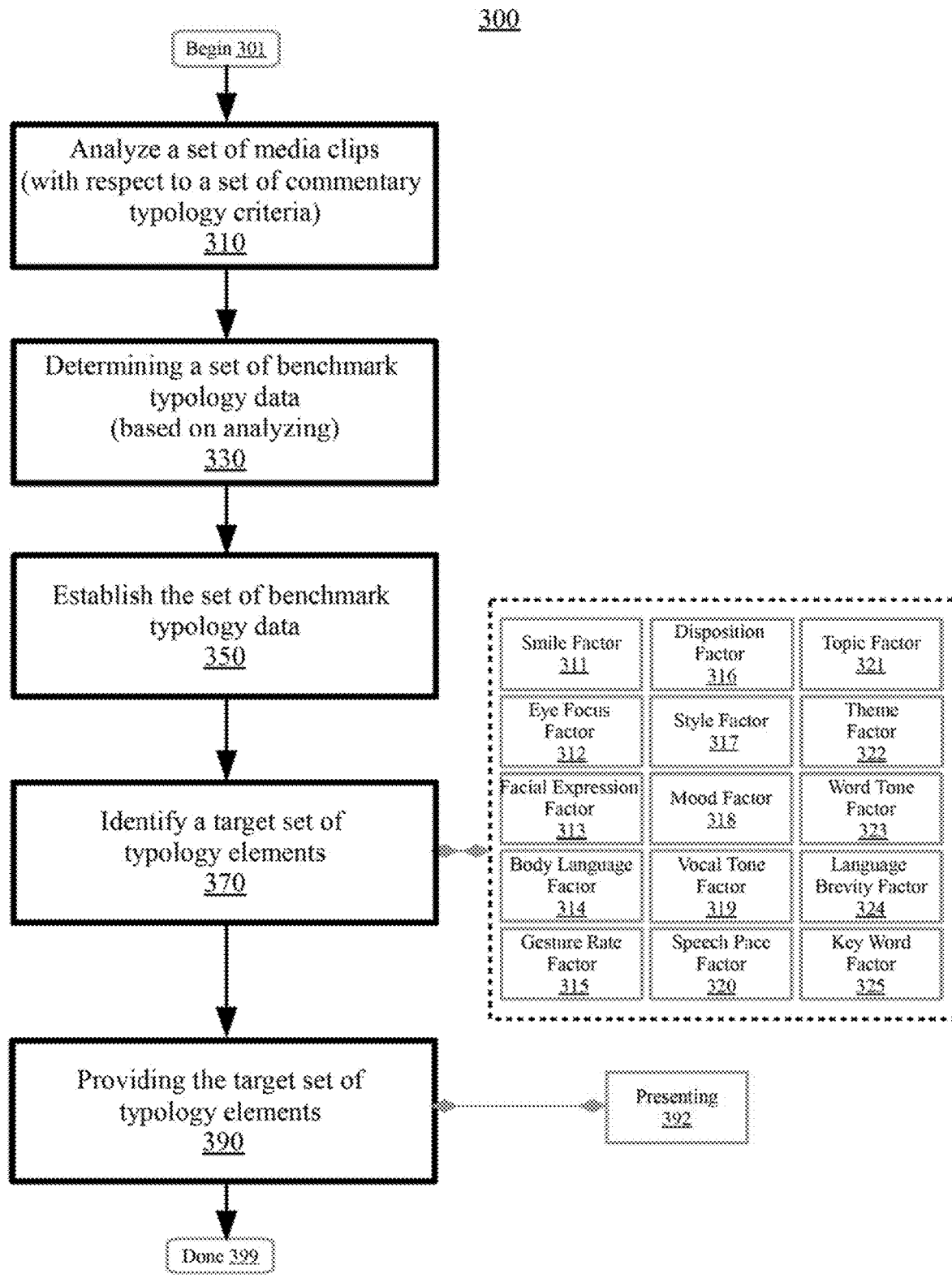
FIG. 3 is a flowchart illustrating a method for managing commentary in a social networking environment, according to embodiments.

FIG. 3 is a flowchart illustrating a method 300 for managing commentary in a social networking environment. Aspects of method 300 relate to identifying and providing a target set of typology elements. At block 310, a set of media clips may be analyzed with respect to a set of commentary typology criteria. At block 330, a set of benchmark typology data may be determined based on analyzing the set of media clips. At block 350, the set of benchmark typology data may be established. The set of benchmark typology data may be established for utilization by the social networking environment. The benchmark typology data may facilitate communication between users in the social networking environment. Aspects of the method 300 may substantially correspond to other embodiments described herein, including FIGS. 1-5. The method 300 may begin at block 301.

At block 370, a target set of typology elements for a new media clip may be identified. The target set of typology elements may be identified using the set of benchmark typology data. Generally, identifying can include ascertaining, recognizing, selecting, or otherwise determining the target set of typology elements. In embodiments, identifying may include using the set of benchmark typology data to select a subset of the set of benchmark typology data that indicates a particular trend or context of the set of media clips. For instance, identifying the target set of typology elements may include ascertaining a subset of the set of typology elements that correspond to benchmark typology data with a benchmark value above a threshold value. As an example, in response to determining that a gesture rate benchmark value (e.g., 6 gestures per minute) exceeds a gesture rate threshold value (e.g., 4 gestures per minute), a gesture rate factor may be identified for inclusion in the target set of typology elements for the new media clip.

In embodiments, aspects of the disclosure relate to identifying a target set of typology elements for a new media clip. Generally, the target set of typology elements can include a group, subset or other portion of the set of benchmark typology that represents a particular feature of the set of media clips. In embodiments, the target set of typology elements may indicate an average or predominant state of the set of media clips with respect to a certain characteristic. In embodiments, the target set of typology elements may include a summary, description, or other characterization of the set of media clips. As described herein, the target set of typology elements may be used for a new media clip. Accordingly, in certain embodiments, the target set of typology elements may be used to inform a user of the overall trend or movement of the set of media clips prior to generation of a new media clip (e.g., to facilitate alignment between the existing set of media clips and the new media clip). As an example, in embodiments, a target set of typology elements may be identified that include a "topic factor" and a "vocal tone factor." The topic factor may indicate the overarching topic of the set of media clips is "horse racing," and the vocal tone factor may indicate that the predominant vocal tone of the set of media clips is "disappointed." Other types of the target set of typology elements are also possible.

As described herein, the target set of typology elements may include a group, subset or other portion of the set of benchmark typology that represents a particular feature of the set of media clips. In embodiments, the target set of typology elements may include a specification or guideline with respect to the set of benchmark typology data that is recommended to a user to facilitate creation of a new media clip. In embodiments, the target set of typology elements may substantially correspond to the set of benchmark typology data. In embodiments, the target set of typology elements may include a selection from a group consisting of at least one of a smile factor at block 311, an eye focus factor at block 312, a facial expression factor at block 313, a body language factor at block 314, or a gesture rate factor at block 315. In embodiments, the target set of typology elements may include a selection from a group consisting of at least one of a disposition factor at block 316, a style factor at block 317, a mood factor at block 318, a vocal tone factor at block 319, or a speech pace factor at block 320. In embodiments, the target set of typology elements may include a selection from a group consisting of at least one of a topic factor at block 321, a theme factor at block 322, a word tone factor at block 323, a language brevity factor at block 324, or a key word factor at block 325.

Consider the following example. In response to establishing the set of benchmark typology data for a set of media clips in a social networking environment, the set of benchmark typology data may be analyzed to identify a subset of the set of benchmark typology data has a benchmark value that exceeds a respective threshold value. Generally, elements of the set of benchmark typology data that exceed corresponding threshold values may be associated with relevance, importance, or significant with respect to the set of media clips. In embodiments, the threshold values for each element of the benchmark typology data may be calculated based on an archive of aggregated benchmark typology data. In embodiments, it may be determined that a vocal tone factor and a topic factor exceed respective threshold values, and be identified for inclusion in the target set of typology elements. As described herein, the target set of typology elements may include a specification or guideline with respect to the set of benchmark typology data that is recommended to a user to facilitate creation of a new media clip. For instance, the vocal tone factor may indicate that the average voice volume of individuals of the set of media clips is 54 decibels, and recommend a voice volume of 50-60 decibels to a user. In embodiments, the topic factor may indicate that the overall topic of the set of media clips is "automobile hydraulics," and suggest that the user match the topic of a new video clip with the existing topic. Other methods of identifying the target set of typology elements are also possible.

At block 390, the target set of typology elements for the new media clip may be provided. The target set of typology elements may be provided by the social networking environment to a user. Generally, providing can include presenting, displaying, supplying, demonstrating, or otherwise conveying information. In certain embodiments, providing the target set of typology elements may include notifying a user of a suggestion or recommendation for creation of a new media clip based on the target set of typology elements. In embodiments, providing the target set of typology elements may include presenting a dialogue box having a list that contains the identified target set of typology elements. In embodiments, providing may include transmitting a message or other textual notification (e.g., email, text message) to a user informing them of the target set of typology elements. Other methods of providing the target set of typology elements for the new media clip are also possible.

In embodiments, providing the target set of typology elements may include presenting at block 392. Generally, presenting may include displaying, showing, exhibiting, or otherwise providing the target set of typology elements. In embodiments, presenting may include conveying or communicating the target set of typology elements using one or more of a variety of mediums (e.g., still images, text, video). In embodiments, presenting can include suggesting target information in advance of generating a new media clip. The target information may include the target set of typology elements as well as additional data and information that explains or describes the set of media clips. The target information may include a summary of the set of media clips that indicates a predominant tone, topic, theme, style, motif, or contextual aspect of the set of media clips. As an example, the target information may indicate that a particular set of media clips has a theme of "Shakespearean." Accordingly, a user may reference the presented target information and target set of typology elements to facilitate aligning (e.g., matching) a new media clip with the existing set of media clips. Other methods of presenting the target set of typology elements are also possible.

Consider the following example. A social networking environment may include a conversation thread with a multitude of media clips. As described herein, the set of media clips may be analyzed, a set of benchmark typology data may be determined, and the set of benchmark typology data may be established. A target set of typology elements including a mood factor and a topic factor may be identified. The topic factor may indicate that the conversation thread has an overarching topic of "Renaissance Period Art," and the mood factor may indicate that the conversation thread has an overall mood of "admiration." In response to receiving a command from a user to initiate generation of a new media clip (or to forecast what a next new media clip may aim for), a dialogue box including the target set of typology elements may be displayed to the user. As described herein, target information including a summary of the set of media clips may also be determined. For instance, the target information may indicate that a first portion of the set of media clips were related to a subtopic of "Piero della Francesca," but that a second portion of the set of media clips (e.g., a more recently submitted portion) relate to a subtopic of "Tintoretto." Accordingly, the user may reference the target set of typology elements as well as the target information to influence the mood and topic of a new media clip (e.g., the user may make "Tintoretto" the topic of his/her video to match the more recent media clips). Other methods of using the target set of typology elements and target information are also possible.

Method 300 concludes at block 399. Aspects of method 300 may provide performance or efficiency benefits for commentary management. For example, aspects of method 300 may have positive impacts with respect to information relevancy and topic congruency. As described herein, the analyzing, determining, establishing, identifying, and providing described herein may each occur in an automated fashion without user invention. Altogether, establishing a set of benchmark typology data for a set of media clips may be associated with performance or efficiency benefits (e.g., communication efficiency, clarity, information accuracy).

Figure 4:
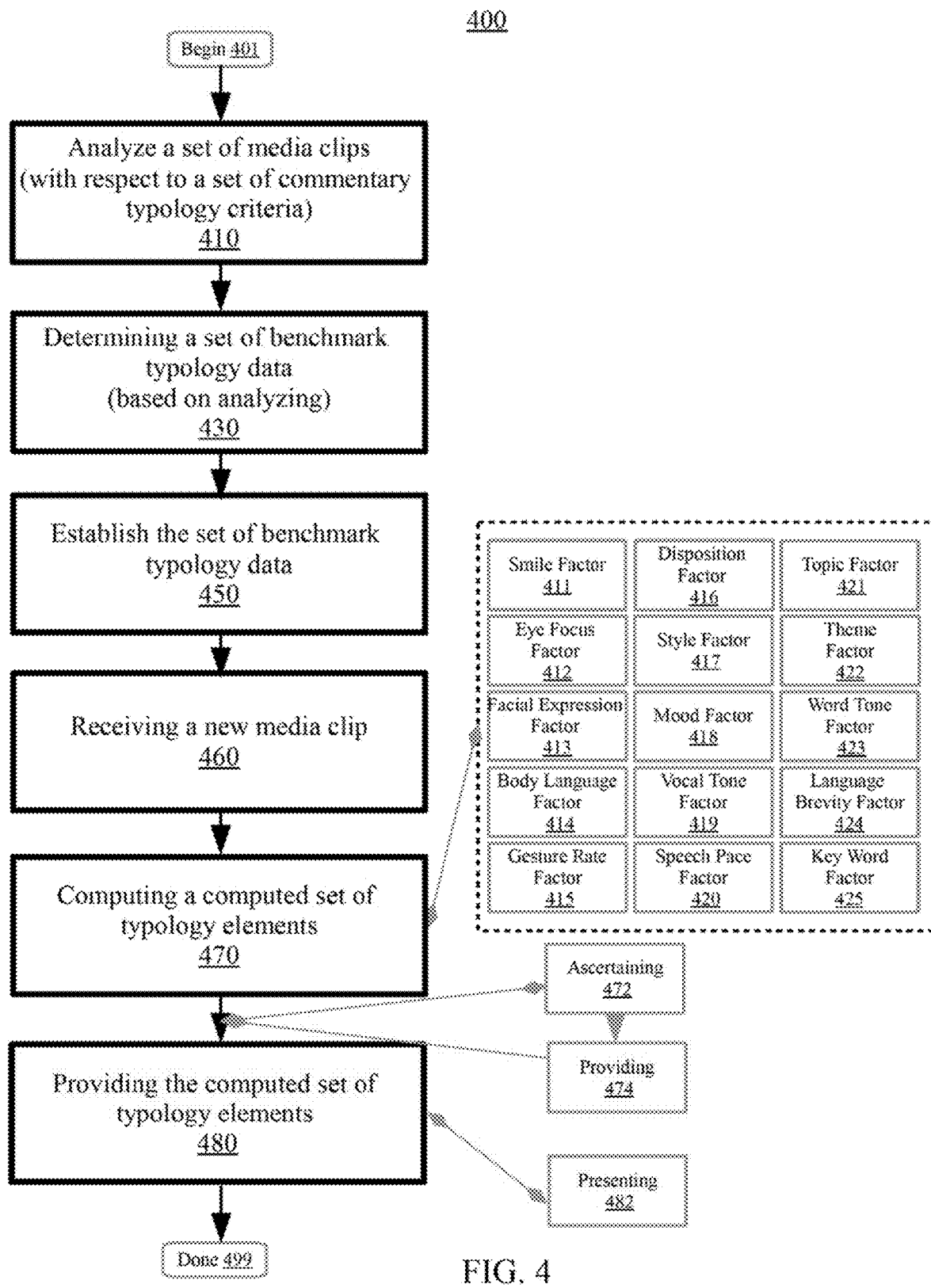
FIG. 4 is a flowchart illustrating a method for managing commentary in a social networking environment, according to embodiments.

FIG. 4 is a flowchart illustrating a method 400 for managing commentary in a social networking environment. Aspects of method 400 relate to receiving a new media clip, and computing and providing a computed set of typology elements. At block 410, a set of media clips may be analyzed with respect to a set of commentary typology criteria. At block 430, a set of benchmark typology data may be determined based on analyzing the set of media clips. At block 450, the set of benchmark typology data may be established. The set of benchmark typology data may be established for utilization by the social networking environment. The benchmark typology data may facilitate communication between users in the social networking environment. Aspects of the method 400 may substantially correspond to other embodiments described herein, including FIGS. 1-5. The method 400 may begin at block 401.

At block 460, a new media clip may be received. Generally, receiving can include collecting, requesting, gathering, obtaining, detecting, or otherwise accepting delivery of the new media clip. In embodiments, the new media clip may be received by the social networking environment from a user. The new media clip can include a text comment, a still image, audio file, video, a combination thereof, or other type of content submission. In embodiments, receiving the new media clip may include reviewing submission of the new media clip before posting it to a conversation thread. As an example, a user may generate the new media clip and upload it to the social networking environment. In response to accepting submission of the new media clip, the social networking environment may utilize one or more content analysis techniques to analyze or parse the content of the new media clip. Other methods of receiving the new media clip are also possible.

At block 470, a computed set of typology elements for the new media clip may be computed. Generally, computing can include calculating, assigning, selecting, identifying, or otherwise determining the set of typology elements. In embodiments, computing the set of typology elements can include ascertaining one or more factors, attributes, or characteristics of the new media clip that are correlated with one or more features of the existing set of media clips. For instance, in certain embodiments, computing the set of typology elements may include identifying aspects of the new media clip that are substantially aligned with (e.g., match) a feature of the existing set of media clips. As an example, computing may include determining that the overall tone of the new media clip matches an established tone of the existing set of media clips. In embodiments, computing the set of typology elements may include identifying aspects of the new media clip that are not substantially aligned with (e.g., do not match) a feature of the existing set of media clips. As an example, it may be determined that the speech pace of the new media clip does not match the average speech pace of the existing set of media clips. Other methods of computing the computed set of typology elements are also possible.

As described herein, the computed set of typology elements can include one or more factors, attributes, characteristics, or other aspects of the new media clip that are correlated with one or more features of the existing set of media clips. The computed set of typology elements may be associated with feedback data that informs a user how various aspects of the new media clip align with corresponding aspects of the existing set of media clips (e.g., a particular aspect aligns closely, another aspect does not align closely and may benefit from revision). In embodiments, the computed set of typology elements may substantially correspond to the set of benchmark typology data. In embodiments, the computed set of typology elements may include a selection from a group consisting of at least one of a smile factor at block 411, an eye focus factor at block 412, a facial expression factor at block 413, a body language factor at block 414, or a gesture rate factor at block 415. In embodiments, the computed set of typology elements may include a selection from a group consisting of at least one of a disposition factor at block 416, a style factor at block 417, a mood factor at block 418, a vocal tone factor at block 419, or a speech pace factor at block 420. In embodiments, the computed set of typology elements may include a selection from a group consisting of at least one of a topic factor at block 421, a theme factor at block 422, a word tone factor at block 423, a language brevity factor at block 424, or a key word factor at block 425.

In embodiments, an alignment score for the new media clip with respect to the set of media clips may be ascertained at block 472. Generally, ascertaining can include calculating, computing, estimating, assigning, or otherwise determining the alignment score. In embodiments, ascertaining the alignment score may include comparing the computed set of typology elements for the new media clip with the set of benchmark typology data. As described herein, the benchmark typology data may include a qualitative or quantitative representation of a norm, average, standard, or typical state of one or more attributes or features of the set of media clips. By comparing the computed set of typology elements (e.g., of the new media clip) with the set of benchmark typology data (e.g., of the existing set of media clips), a relative disparity, divergence, or other variation between the new media clip and the set of benchmark typology data may be determined. Accordingly, the relative disparity or divergence between the new media clip and the set of benchmark typology data may be represented by an alignment score. In embodiments, the alignment score may be expressed as an integer between 0 and 100, wherein relatively lower integers indicate lower degrees of alignment (e.g., similarity), and relatively greater integers indicate greater degrees of alignment between the new media clip and the existing set of media clips. In embodiments, new media clips with alignment score below a threshold value may be withheld from publication on the social networking environment. Other methods of ascertaining the alignment score are also possible.

Consider the following example. A social networking environment may include a set of media clips. In embodiments, the set of media clips may include a series of video comments in which users share their impressions and thoughts on a particular product or service. The set of media clips may be associated with benchmark typology data including a topic benchmark value, a speech pace benchmark value, and a smile benchmark value. The topic benchmark value may include a topic of "ACME Office Chair 2016 Comfort," with an associated benchmark value of 24 (e.g., an indication of the degree to which the discussion diverges from the main topic to touch on other topics, where lesser integers indicate lesser variance and greater integers indicate greater variance). The speech pace benchmark value may indicate an average speech pace of "159 words per minute." The smile benchmark value may indicate a smile frequency of "3 times per minute" with an average smile inclination of "37 degrees from the horizontal." In embodiments, a new media clip may be generated by a user and updated to the social networking environment. As described herein, the social networking environment may review the new media clip (e.g., prior to publication) and determine a computed set of typology elements. In embodiments, the computed set of typology elements may substantially correspond to the benchmark typology data, and include a "topic factor," a "speech pace factor," and a "smile factor." The topic factor may include a topic of "ACME Office Chair 2016 Affordability," the speech pace factor may include a speech pace of "173 words per minute," and the smile factor may include a smile frequency of "1 time per 2 minutes" with a smile inclination of "44 degrees from the horizontal." As described herein, the computed set of typology elements may be compared to the benchmark typology data, and the differences between the new media clip and the existing set of media clips may be analyzed and weighted using one or more statistical computation techniques or algorithms to calculate the alignment score for the new media clip. In embodiments, an alignment score of "84" may be calculated for the new media clip (e.g., the new media clip is substantially aligned with the existing set of media clips, although differences in topic focus, rapid speech pace, and lesser smile frequency result in some divergence). Other methods of ascertaining the alignment score are also possible.

In embodiments, the alignment score may be provided to the user at block 474. Generally, providing can include presenting, sending, transmitting, displaying, or notifying a user of the alignment score. In embodiments, providing the alignment score may include appending information regarding reasons for the alignment score to the user, or displaying suggestions that may be referenced by the user to increase the relative alignment between the new media clip and the existing set of media clips. For instance, referring to the example above, providing the alignment score may include displaying the calculated alignment score of "84" along with a detailed breakdown of the reasons for the alignment score. As an example, the user may be notified that a slower pace of speech, increased smile frequency, and refocused topic on "ACME Office Chair 2016 Comfort" (e.g., rather than affordability) may result in an increased alignment score. In embodiments, providing the alignment score may also include providing one or more options to a user to edit or modify the new media clip. For instance, the user may be presented with options to edit a portion of the media clip, re-record a portion of the media clip, or the like. Other methods of providing the alignment score are also possible.

At block 480, the computed set of typology elements may be provided. The computed set of typology elements may be provided by the social networking environment to a user. Generally, providing can include presenting, displaying, sending, transmitting, supplying, demonstrating, or otherwise conveying the computed set of typology elements. In certain embodiments, providing the computed set of typology elements can include generating a still image, an array, or a list (e.g., for presentation in a graphical user interface) that includes the computed set of typology elements determined for the new media clip. As an example, a list may be generated and presented to a user that includes typology elements of "key word factor," "eye focus factor," and "disposition factor." In embodiments, providing may include transmitting a message or other textual notification (e.g., email, text message) to a user informing them of the computed set of typology elements. Other methods of providing the computed set of typology elements for the new media clip are also possible.

In embodiments, providing the computed set of typology elements may include presenting a set of computed information at block 482. Generally, presenting can include displaying, showing, exhibiting, or otherwise providing the target set of typology elements. In embodiments, presenting may include conveying or communicating the computed set of typology elements using one or more of a variety of mediums (e.g., still images, text, video). In embodiments, presenting can include displaying the set of computed information in response to receiving the new media clip. The set of computed information may be used to compare the alignment of the new media clip with the set of media clips. For instance, the set of computed information may include playback of the new media clip with appended comments, tags, and other annotations that advise a user on potential changes or modifications that may be made to the new media clip to increase the alignment score with respect to the existing set of media clips. As examples, the set of computed information may include comments that appear during playback of the media clip that indicate to a user points where their speech pace was particularly rapid (e.g., above a threshold), where the topic veered to a tangential topic, their tone of voice did not align with the existing media clips, or the like. Other methods of presenting the set of computed information are also possible.

Method 400 concludes at block 499. Aspects of method 400 may provide performance or efficiency benefits for commentary management. For example, aspects of method 400 may have positive impacts with respect to information relevancy and topic congruency. As described herein, the analyzing, determining, establishing, identifying, and providing described herein may each occur in an automated fashion without user invention. Altogether, establishing a set of benchmark typology data for a set of media clips may be associated with performance or efficiency benefits (e.g., communication efficiency, clarity, information accuracy).

Figure 5:
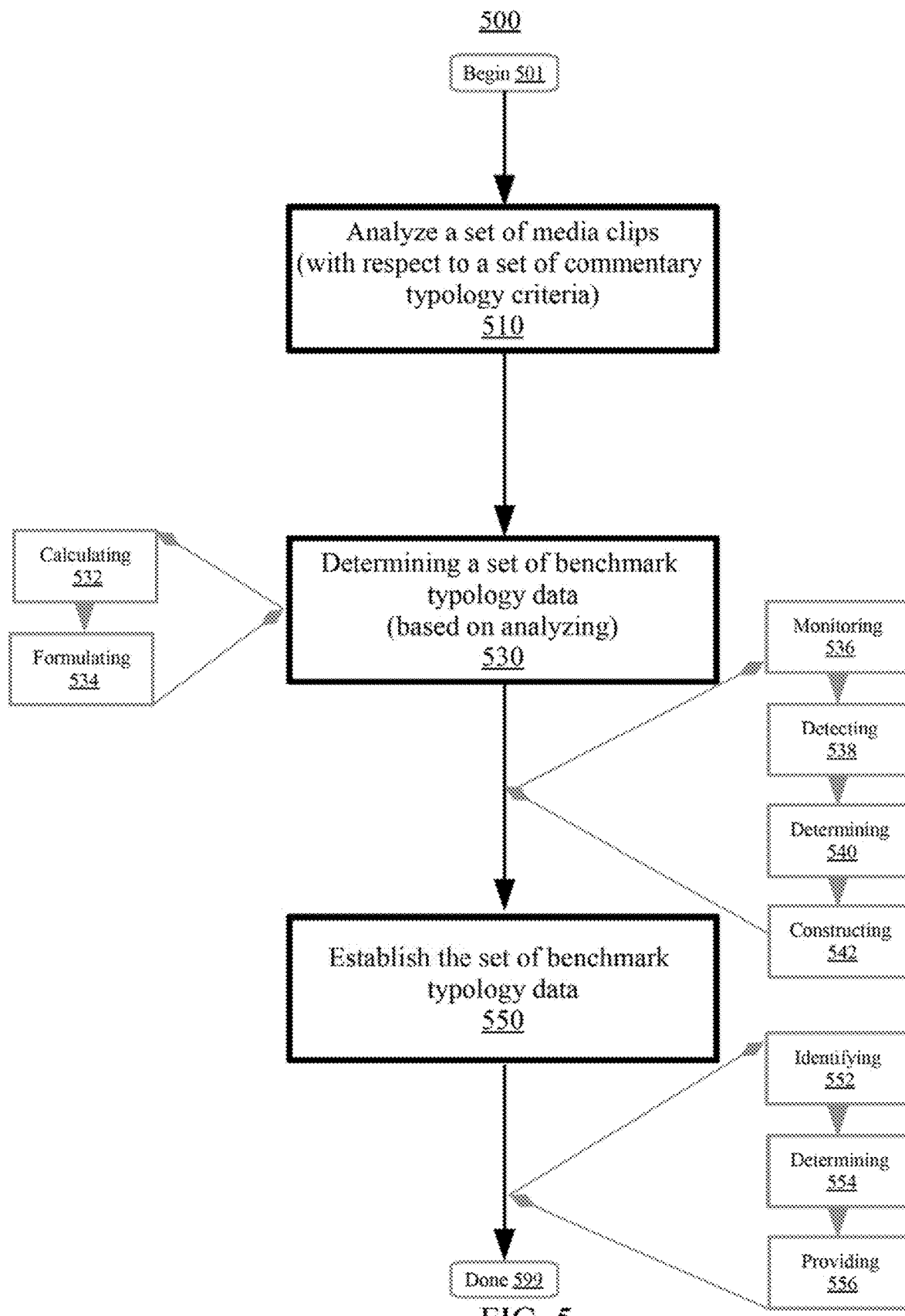
FIG. 5 is a flowchart illustrating a method for managing commentary in a social networking environment, according to embodiments.

FIG. 5 is a flowchart illustrating a method 500 for managing commentary in a social networking environment. Aspects of method 500 relate to a threshold change with respect to the benchmark typology data, and the determination of a new arrangement for the set of media clips. At block 510, a set of media clips may be analyzed with respect to a set of commentary typology criteria. At block 530, a set of benchmark typology data may be determined based on analyzing the set of media clips. At block 550, the set of benchmark typology data may be established. The set of benchmark typology data may be established for utilization by the social networking environment. The benchmark typology data may facilitate communication between users in the social networking environment. Aspects of the method 500 may substantially correspond to other embodiments described herein, including FIGS. 1-5. The method 500 may begin at block 501.

In embodiments, determining the set of benchmark typology data may include calculating the set of commentary norms at block 532. The commentary norms may be calculated using a clustering technique. Generally, calculating can include computing, estimating, assessing, assigning, identifying, or otherwise determining the set of commentary norms. As described herein, the commentary norms can include qualitative or quantitative representations of the average, standard, or typical state of one or more attributes or features of the set of media clips. As an example, a commentary norm for the set of media clips may indicate that the average vocal tone of the set of media clips is 58 decibels. In embodiments, the set of commentary norms may be calculated using a clustering technique. The clustering technique can include a method of statistical data analysis for grouping one or more objects (e.g., the set of benchmark typology data), and identifying patterns, links, and relationships between members of the group. As examples, the clustering technique can include k-means clustering, hierarchical clustering models, multivariate normal distributions, connectivity models, centroid models, density models, group models, graph-based models, or the like. Other types of clustering techniques are also possible.

In embodiments, the set of benchmark typology data may be formulated at block 534. The set of benchmark typology data may be formulated based on the set of commentary norms. Generally, formulating can include computing, identifying, ascertaining, or otherwise determining the set of benchmark typology data. In embodiments, formulating may include analyzing the commentary norms and determining the benchmark values for each element of the set of benchmark typology data based on the clustering technique. For instance, formulating may include generating a range distribution of the commentary norms, and calculating the benchmark values for the benchmark typology data based on the distribution of the commentary norms. Other methods of formulating the set of benchmark typology data are also possible.

In embodiments, a threshold change in the set of benchmark typology data may be monitored for at block 536. The threshold change in the set of benchmark typology data may be monitored for by the social networking environment. Generally, monitoring can include observing, inspecting, surveying, checking, scanning, or analyzing for the threshold change in the set of benchmark typology data. In embodiments, the threshold change can include a variation, transition, adjustment, or other change with respect to the set of benchmark typology data. For instance, the threshold change may include a moving average of the benchmark values associated with the benchmark typology data (e.g., average over a subset of the benchmark typology data or episodes; most recent 25 media clips, oldest 25 media clips). As an example, the threshold change may include a variation of one or more benchmark values that exceeds a threshold value. The threshold value may include an absolute threshold (e.g., increase or decrease of a benchmark value by 20 points) or a relative threshold (e.g., increase or decrease of a benchmark value by 30%). In embodiments, monitoring can include recording the benchmark value for each element of the set of benchmark typology data (e.g., in a database), and observing for changes in the benchmark value as new media clips are added to the set of media clips. Other methods of monitoring for the threshold change are also possible.

In embodiments, the threshold change may be detected in the set of benchmark typology data at block 538. The threshold change may be detected by the social networking environment based on the set of benchmark typology data. Generally, detecting can include recognizing, discovering, ascertaining, discerning, or otherwise identifying the threshold change in the set of benchmark data. In embodiments, detecting can include inspecting the recorded benchmark values for each element of the set of benchmark typology data and identifying that one or more benchmark values is associated with a threshold change (e.g., benchmark value increase or decrease that exceeds a threshold value). Consider the following example. A social networking environment may include a conversation thread having three media clips associated with a gesture rate benchmark value of "3 gestures per minute." The conversation thread may have a threshold value of 2 gestures per minute (e.g., a change of the gesture rate benchmark value by 2 gestures per minute would constitute a threshold change). Two new media clips may be added to the conversation thread, and gesture rate benchmark values of 8 and 9 may be detected for the new media clips, respectively. Accordingly, the overall benchmark value of the conversation thread may be recalculated and determined to be 5.2. As the change (e.g., +2.2) exceeds the threshold value of 2 gestures per minute, it may be detected as a threshold change. Other methods of detecting the threshold change are also possible.

In embodiments, a new arrangement of the set of media clips may be determined at block 540. The new arrangement may include both a first subset of the set of media clips and a second subset of the set of media clips. Generally, determining can include identifying, arranging, ascertaining, or establishing the new arrangement of the set of media clips. The new arrangement can include an interface, platform, design, or distribution for managing presentation of the set of media clips. In embodiments, determining may include rearranging or organizing the set of media clips within the social networking environment. For instance, as described herein, determining can include creating a first subset and a second subset of the set of media clips. The first and second subset of the set of media clips may include groupings, assortments, or other collections of the media clips. In embodiments, the new arrangement of the set of media clips may be based on the threshold change. For instance, the set of media clips may be divided into one or more subsets in response to detecting threshold changes with respect to topic, tone, mood, speech pace, body language, or other aspect of the set of media clips. As an example, in embodiments, in response to detecting a threshold change in which a topic changes from a first topic to a second topic within the set of media clips, the set of media clips may be divided into a first subset related to the first topic and a second subset related to the second topic. Other methods of determining the new arrangement for the set of media clips are also possible.

In embodiments, the new arrangement may be constructed at block 542. The new arrangement may be constructed to have the first subset of the set of media clips separate from the second subset of the set of media clips. Generally, constructing can include assembling, building, structuring, generating, or otherwise establishing the new arrangement. In embodiments, constructing the new arrangement may include splitting a conversation thread into two individual conversation threads within the social networking environment, such that the first subset of the set of media clips is placed in a first conversation thread and the second subset of the set of media clips is placed in a second conversation thread. In embodiments, constructing the new arrangement may include organizing the set of media clips into one or more sub-threads within the original conversation thread. As an example, constructing the new arrangement may include sorting the set of media clips based on tone, topic, or other attribute, and organizing the sorted media clips for presentation in a graphical user interface. Other methods of constructing the new arrangement are also possible.

Consider the following example. A social networking environment may include a set of media clips. In embodiments, it may be detected that a first portion of the set of media clips relate to a topic of "rainforest deforestation," but that as the conversation thread progressed, an increasing number of media clips may be related to a topic of "rainforest animal protection." Additionally, as the conversation thread progressed, it may be detected that the tone of the conversation has changed from "disapproving" to "hopeful." Accordingly, as described herein, aspects of the disclosure relate to constructing a new arrangement for the set of media clips. In embodiments, constructing the new arrangement may include sorting the media clips of the conversation thread and creating configurations to display particular media clips based on their topic, tone, submission date, or other attribute. For instance, in embodiments, the new arrangement may include establishing a first sub-thread for media clips related to "rainforest deforestation" and a second sub-thread for media clips related to "rainforest animal protection." In embodiments, the new arrangement may include establishing a first sub-thread for media clips associated with a tone of "disapproving" and a second sub-thread for media clips associated with a tone of "hopeful." Other methods of constructing the new arrangement are also possible.

In embodiments, the set of benchmark typology data may be identified at block 552. The set of benchmark typology data may be identified for a set of users which correlate with the set of media clips. Generally, identifying can include ascertaining, recognizing, selecting, or otherwise determining the set of benchmark typology data. In embodiments, identifying the set of benchmark typology data may include accessing a social networking profile for one or more users of the social networking environment. The social networking profile can include a page or group of pages that include information regarding the first user. The social networking profile can include information related to the work and educational experience, likes and dislikes, attitude toward particular topics, past comment and media clip submission history, and the like. In embodiments, the social networking profiles for users who have submitted media clips may be analyzed to identify the set of benchmark typology data for the user. The set of benchmark typology data may indicate attributes or characteristics of a particular user's posting habits. As an example, based on the social networking profile, benchmark typology data of "style factor-expository," "mood-upbeat," and "language brevity factor-lengthy" may be identified for a user. Other methods of identifying the set of benchmark typology data for a user are also possible.

In embodiments, a sentiment trend of the set of users may be determined at block 554. The sentiment trend may be determined by the social networking environment based on the benchmark typology data for the set of users. Generally, determining can include ascertaining, predicting, concluding, estimating, or otherwise identifying the sentiment trend. The sentiment trend can include a tendency or general direction of the tone or mood of a particular set of media clips. In embodiments, the sentiment trend may include a prediction of the outcome of a conversation thread based on the characteristics of the users involved. Determining the sentiment trend for the set of users (e.g., for the conversation thread) may include comparing the benchmark typology data for each user with the benchmark typology data for other users involved in the same conversation thread, and establishing one or more relationships between the different benchmark typology data attributes to identify an expected sentiment trend. As examples, the sentiment trend may include descriptions such as "argumentative," "general agreement," "technical discussion," "unfocused" or the like. Other methods of determining the sentiment trend are also possible.

In embodiments, the sentiment trend may be provided at block 556. The sentiment trend may be provided by the social networking environment to a user. Generally, providing can include presenting, displaying, supplying, demonstrating, or otherwise conveying the sentiment trend. In embodiments, providing the sentiment trend may include generating a notification (e.g., for presentation in a graphical user interface) that includes the sentiment trend. In embodiments, providing the sentiment trend may include annotating the title or subject line of the conversation thread with a tag, marker, highlighted, text, or message box that indicates the sentiment trend. As an example, a conversation thread in which users have strong opinions about a particular topic that results in a heated dispute between one or more users, the title of the conversation thread may be highlighted in red with stylized flame markings. In response to a user placing a cursor (e.g., mouse pointer, finger) over the title, a message box with the text "argumentative" may be displayed. Other methods of providing the sentiment trend are also possible.

Consider the following example. The social networking environment may include a conversation thread having a set of media clips submitted by two active participants. The conversation thread may relate to a topic of "School Uniforms: Yes or No?" As described herein, in certain embodiments, social networking profiles for the two participants in the conversation thread may be analyzed, and benchmark typography data may be identified for each participant. In embodiments, it may be determined that a first user is associated with benchmark typography data of "disposition—stubborn," and that the first user holds a position as the headmaster of a boarding school. It may be determined that a second user is associated with benchmark typography data of "disposition—opinionated," and that the second user belongs to an advocacy group for the freedom of youth expression. Based on the benchmark typography data and other information from the social networking profiles for the users, a sentiment trend of "argumentative" may be identified for the users with respect to the conversation thread. As described herein, the conversation thread may be marked with an identifier to indicate the sentiment trend to other users. Other methods of determining and providing the sentiment trend are also possible.

Method 500 concludes at block 599. Aspects of method 500 may provide performance or efficiency benefits for commentary management. For example, aspects of method 500 may have positive impacts with respect to information relevancy and topic congruency. As described herein, the analyzing, determining, establishing, identifying, and providing described herein may each occur in an automated fashion without user invention. Altogether, establishing a set of benchmark typology data for a set of media clips may be associated with performance or efficiency benefits (e.g., communication efficiency, clarity, information accuracy).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
   analyzing a set of media clips communicated between a set of users in a social networking environment using a set of commentary typology criteria;
   determining, based on the analyzed set of media clips communicated between the set of users, a set of benchmark typology data;
   identifying, using the determined set of benchmark typology data, a target set of typology elements for a new media clip, wherein the identified target set of typology elements is selected from the group consisting of a topic factor, a theme factor, a word tone factor, a language brevity factor, and a key word factor;
   providing, by the social networking environment to a user, the identified target set of typology elements for the new media clip; and
   managing commentary in the social networking environment using the determined set of benchmark typology data.

2. The method of claim 1, wherein the determined set of benchmark typology data indicates a set of commentary norms of the analyzed set of media clips.

3. The method of claim 1, further comprising:
   establishing, for utilization by the social networking environment, the determined set of benchmark typology data.

4. The method of claim 1, wherein the set of commentary typology criteria includes a selection from the group consisting of:
   a smile criterion, an eye focus criterion, a facial expression criterion, a body language criterion, a gesture rate criterion, a disposition criterion, a style criterion, a mood criterion, a vocal tone criterion, a speech pace criterion, a topic criterion, a theme criterion, a word tone criterion, a language brevity criterion, and a key word criterion.

5. The method of claim 1, wherein the set of benchmark typology data includes a selection from the group consisting of:
   a smile benchmark value, an eye focus benchmark value, a facial expression benchmark value, a body language benchmark value, a gesture rate benchmark value, a disposition benchmark value, a style benchmark value, a mood benchmark value, a vocal tone benchmark value, a speech pace benchmark value, a topic benchmark value, a theme benchmark value, a word tone benchmark value, a language brevity benchmark value, and a key word benchmark value.

6. The method of claim 1, wherein the identified target set of typology elements further comprises:
   a smile factor, an eye focus factor, a facial expression factor, a body language factor, and a gesture rate factor.

7. The method of claim 1, wherein the identified target set of typology elements further comprises:
a disposition factor, a style factor, a mood factor, a vocal tone factor, and a speech pace factor.

8. The method of claim 1, wherein providing the identified target set of typology elements for the new media clip, further comprises: presenting a set of suggested target information in advance of generating the new media clip for utilization to align the new media clip with the set of media clips.

9. The method of claim 1, further comprising:
receiving a new media clip;
computing, based on the new media clip, a computed set of typology elements for the new media clip; and
providing, by the social networking environment to a user, the computed set of typology elements for the new media clip.

10. The method of claim 9, wherein the computed set of typology elements further comprises:
a smile factor, an eye focus factor, a facial expression factor, a body language factor, and a gesture rate factor.

11. The method of claim 9, wherein the computed set of typology elements further comprises:
a disposition factor, a style factor, a mood factor, a vocal tone factor, and a speech pace factor.

12. The method of claim 9, wherein the computed set of typology elements further comprises:
a topic factor, a theme factor, a word tone factor, a language brevity factor, and a key word factor.

13. The method of claim 9, further comprising:
ascertaining, by comparing the computed set of typology elements for the new media clip with the set of benchmark typology data, an alignment score for the new media clip with respect to the set of media clips; and
providing the alignment score to the user.

14. The method of claim 9, wherein providing the computed set of typology elements for the new media clip further comprises: presenting a set of computed information in response to receiving the new media clip for utilization to compare alignment of the new media clip with the set of media clips.

15. The method of claim 1, further comprising:
monitoring, by the social networking environment, for a threshold change in the set of benchmark typology data;
detecting, by the social networking environment based on the set of benchmark typology data, the threshold change in the set of benchmark typology data;
determining, based on the threshold change in the set of benchmark typology data, a new arrangement of the set of media clips that have audio, wherein the new arrangement includes both a first subset of the set of media clips and a second subset of the set of media clips; and
constructing, in the social networking environment, the new arrangement to have the first subset of the set of media clips separate from the second subset of the set of media clips.

16. A system for commentary management in a social networking environment, the system comprising:
a memory having a set of computer readable computer instructions; and
a processor for executing the set of computer readable instructions, the set of computer readable instructions comprising:
analyzing a set of media clips communicated between a set of users in a social networking environment using a set of commentary typology criteria;
determining, based on the analyzed set of media clips communicated between the set of users, a set of benchmark typology data;
identifying, using the determined set of benchmark typology data, a target set of typology elements for a new media clip, wherein the identified target set of typology elements is selected from the group consisting of a topic factor, a theme factor, a word tone factor, a language brevity factor, and a key word factor;
providing, by the social networking environment to a user, the identified target set of typology elements for the new media clip; and
managing commentary in the social networking environment using the determined set of benchmark typology data.

17. A computer program product for commentary management in a social networking environment, the computer program product comprising a computer readable storage medium having program instructions embodied therewith, wherein the computer readable storage medium is not a transitory signal per se, the program instructions executable by a processor to cause the processor to perform a method comprising:
analyzing a set of media clips communicated between a set of users in a social networking environment using a set of commentary typology criteria;
determining, based on the analyzed set of media clips communicated between the set of users, a set of benchmark typology data;
identifying, using the determined set of benchmark typology data, a target set of typology elements for a new media clip, wherein the identified target set of typology elements is selected from the group consisting of a topic factor, a theme factor, a word tone factor, a language brevity factor, and a key word factor;
providing, by the social networking environment to a user, the identified target set of typology elements for the new media clip; and
managing commentary in the social networking environment using the determined set of benchmark typology data.

18. The computer program product of claim 17, wherein at least one of:
the program instructions are stored in a computer readable storage medium in a data processing system, and wherein the program instructions were downloaded over a network from a remote data processing system; or
the program instructions are stored in a computer readable storage medium in a server data processing system, and wherein the program instructions are downloaded over a network to a remote data processing system for use in a computer readable storage medium with the remote data processing system.

* * * * *